United States Patent
Sakurai (10) Patent No.: US 12,418,040 B2
(45) Date of Patent: Sep. 16, 2025

(54) POWER STORAGE MODULE AND MANUFACTURING METHOD FOR POWER STORAGE MODULE

(71) Applicant: HONDA MOTOR CO., LTD., Tokyo (JP)

(72) Inventor: Atsushi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 708 days.

(21) Appl. No.: 17/624,588

(22) PCT Filed: Jun. 24, 2020

(86) PCT No.: PCT/JP2020/024870
§ 371 (c)(1),
(2) Date: Jan. 4, 2022

(87) PCT Pub. No.: WO2021/006042
PCT Pub. Date: Jan. 14, 2021

(65) Prior Publication Data
US 2022/0255115 A1  Aug. 11, 2022

(30) Foreign Application Priority Data
Jul. 10, 2019 (JP) .................. 2019-128329

(51) Int. Cl.
*H01M 10/04* (2006.01)
*H01M 50/183* (2021.01)
(Continued)

(52) U.S. Cl.
CPC ..... *H01M 10/0481* (2013.01); *H01M 50/183* (2021.01); *H01M 50/209* (2021.01); *H01M 50/291* (2021.01); *H01M 2220/20* (2013.01)

(58) Field of Classification Search
CPC ................................................ H01M 10/0481
See application file for complete search history.

(56) References Cited

U.S. PATENT DOCUMENTS

| 10,355,304 B2 * | 7/2019 | Karditsas | ............ H01M 50/291 |
| 2011/0177377 A1 * | 7/2011 | Dube | .................. H01M 50/105 |
| | | | 429/153 |

(Continued)

FOREIGN PATENT DOCUMENTS

| CN | 107667442 | 2/2018 |
| CN | 108140769 | 6/2018 |

(Continued)

OTHER PUBLICATIONS

Machine translation of WO 2018/1010079 (no date) (Year: 0000).*

(Continued)

*Primary Examiner* — Amanda C. Walke
(74) *Attorney, Agent, or Firm* — Amin, Turocy & Watson, LLP (57) ABSTRACT

Provided is a power storage module (1) including a cell storage body (2), a cell storage space (27) disposed in the cell storage body (2) and having parallel wall surfaces, a power storage cell (3) stored in the cell storage space (27), and a sheet-shaped pressing member (4) disposed to face the wall surfaces of the cell storage space (27) via the power storage cell (3) and configured to apply a pressing force to the wall surfaces with respect to the power storage cell (3), in which the pressing member (4) has a deformable member made of an elastic body or a structure having expansibility and a storage bag in which the deformable member is stored, and the storage bag is sealable by closing a storage bag opening and is deformed according to a change in shape of the deformable member.

17 Claims, 8 Drawing Sheets

(51) Int. Cl.
 H01M 50/209 (2021.01)
 H01M 50/291 (2021.01)

(56) References Cited

U.S. PATENT DOCUMENTS

| | | | |
|---|---|---|---|
| 2012/0219839 A1 | 8/2012 | Kritzer et al. | |
| 2016/0329538 A1 | 11/2016 | Hughes | |
| 2017/0098855 A1 | 4/2017 | Karditsas et al. | |
| 2018/0287223 A1* | 10/2018 | Meng | H01M 10/425 |
| 2018/0294510 A1* | 10/2018 | Kitaura | H01M 10/647 |
| 2019/0229364 A1* | 7/2019 | Sakamoto | H01M 50/211 |
| 2019/0280325 A1* | 9/2019 | Jung | H01M 10/0481 |
| 2020/0287252 A1 | 9/2020 | Li et al. | |

FOREIGN PATENT DOCUMENTS

| | | | | |
|---|---|---|---|---|
| CN | 207587926 | | 7/2018 | |
| CN | 109428021 | | 3/2019 | |
| CN | 110311068 | | 10/2019 | |
| CN | 111834564 A | * | 10/2020 | ........ H01M 10/0413 |
| DE | 102015007408 | | 12/2016 | |
| JP | 48-025222 | | 3/1973 | |
| JP | 2004-103415 | | 4/2004 | |
| JP | 2007-173030 | | 7/2007 | |
| JP | 2018-521447 | | 8/2018 | |
| JP | 2020-064795 | | 4/2020 | |
| KR | 10-2017-0039948 | | 4/2017 | |
| WO | WO-2015141631 A1 | * | 9/2015 | ........ H01M 10/0481 |
| WO | WO-2016056846 A1 | * | 4/2016 | .......... H01M 10/052 |
| WO | 2016/179557 | | 11/2016 | |
| WO | 2018/101079 | | 6/2018 | |
| WO | 2018/207608 | | 11/2018 | |
| WO | WO-2019107734 A1 | * | 6/2019 | ........ H01M 10/0481 |

OTHER PUBLICATIONS

Machine translation of CN 10942802 (no date) (Year: 0000).*
Chinese Office Action for Chinese Patent Application No. 202080043880.4 mailed Apr. 21, 2023.
International Search Report and Written Opinion for International Application No. PCT/JP2020/024870 mailed on Sep. 24, 2020, 11 pages.
Japanese Office Action for Japanese Patent Application No. 2021-530584 mailed Jan. 4, 2023.

* cited by examiner

POWER STORAGE MODULE AND MANUFACTURING METHOD FOR POWER STORAGE MODULE

TECHNICAL FIELD

The present invention relates to a power storage module and a manufacturing method for the power storage module.

Priority is claimed on Japanese Patent Application No. 2019-128329 filed on Jul. 10, 2019, the content of which is incorporated herein by reference.

BACKGROUND ART

A power storage module is installed in hybrid cars, electric vehicles, and the like. A power storage module is configured by laminating a plurality of power storage cells. A power storage cell includes a battery element formed of a positive electrode and a negative electrode. As a power storage cell, there are one in which a battery element is stored inside a metal cell can, and one in which a battery element is sealed in a resin laminate film.

For example, Patent Document 1 describes a battery pack module in which laminated secondary batteries, in which an elastic body that applies a repulsive force in a lamination direction of battery elements is disposed on at least one surface of the battery elements and the battery elements and the elastic body are vacuum-packaged by a laminate film, are connected in parallel, in series, or in series and parallel.

CITATION LIST

Patent Document

Patent Document 1: Japanese Unexamined Patent Application, First Publication No. 2004-103415

SUMMARY OF INVENTION

Technical Problem

In a power storage module mounted on a vehicle, when power storage cells rattle due to vibration during traveling or the like, there is a likelihood that reliability of electrical connections between the power storage cells or between the power storage cells and the outside will be impaired.

Also, when an acceleration due to a collision load or the like is input to the power storage module in a lamination direction of the power storage cells, all the power storage cells move in the input direction of the acceleration. An amount of movement of each of the power storage cells at this time is larger when a power storage cell is disposed closer to the input side of the acceleration. Therefore, a positional relationship between an electrode terminal of the power storage cell and a connection portion of a bus bar and/or a harness in the power storage module changes relatively greatly. As a result, a large load may be applied to a connection portion with the electrode terminal of the power storage cell, and reliability of an electrical connection in the power storage module may be impaired.

The present invention has been made in view of the above circumstances, and an objective of the present invention is to provide a power storage module with good reliability of an electrical connection in which a plurality of power storage cells are held without rattling and movement of the power storage cells when an acceleration is input from a lamination direction of the power storage cells is suppressed, and a manufacturing method for the power storage module.

Solution to Problem

In order to achieve the above-described objective, the present invention provides the following means.

(1) A power storage module including a cell storage body, a cell storage space disposed in the cell storage body and having parallel wall surfaces, a power storage cell stored in the cell storage space, and a sheet-shaped pressing member disposed to face the wall surfaces of the cell storage space via the power storage cell and configured to apply a pressing force to the wall surfaces with respect to the power storage cell, in which the pressing member includes a deformable member made of an elastic body or a structure having expansibility and a storage bag in which the deformable member is stored, and the storage bag is sealable by closing a storage bag opening thereof and is deformed according to a change in shape of the deformable member.

(2) The power storage module according to the above-described (1), in which the pressing member presses the power storage cell against the wall surfaces by expanding in a thickness direction.

(3) The power storage module according to the above-described (1) or (2), in which the pressing member is sandwiched between two power storage cells.

(4) The power storage module according to any one of the above-described (1) to (3), in which a fluid is sealed in the storage bag.

(5) The power storage module according to any one of the above-described (1) to (4), in which the deformable member is of a foamed body.

(6) The power storage module according to any one of the above-described (1) to (4), in which the deformable member is of a resin fiber aggregate.

(7) The power storage module according to any one of the above-described (1) to (6), in which the cell storage space has openings which open in a direction in which the parallel wall surfaces extend, a positive electrode terminal of the power storage cell is disposed in one of the openings and a negative electrode terminal of the power storage cell is disposed in the other of the openings, and the storage bag opening is provided at an edge portion of the pressing member exposed from one or the other of the openings and the storage bag opening is disposed at a position not overlapping the positive electrode terminal or the negative electrode terminal when viewed from a thickness direction of the power storage cell.

(8) The power storage module according to any one of the above-described (1) to (6), in which the cell storage space has openings which open in a direction in which the parallel wall surfaces extend and a positive electrode terminal and a negative electrode terminal of the power storage cell are disposed in one of the openings, and the storage bag opening is provided at an edge portion of the pressing member exposed from the other of the openings.

(9) The power storage module according to any one of the above-described (1) to (8), in which a plurality of cell storage spaces are linearly disposed inside the cell storage body in a direction in which the parallel wall surfaces are aligned.

(10) The power storage module according to any one of the above-described (1) to (9), in which the cell storage body is an integrally molded product obtained by impact molding or extrusion molding of a metal material.

(11) A manufacturing method for a power storage module including a pressing member forming step in which a deformable member made of an elastic body or a structure having expansibility is stored in a storage bag, the deformable member is compressed by reducing a pressure of the inside of the storage bag, and then the storage bag is sealed to form a sheet-shaped pressing member, a lamination step in which a power storage cell and the pressing member are laminated and stored in a cell storage space having parallel wall surfaces disposed in a cell storage body, and a restoration step in which a pressing force against the wall surfaces with respect to the power storage cell is imparted to the pressing member by opening the storage bag to form a storage bag opening and causing a fluid to flow into the storage bag from the storage bag opening to restore the deformable member from the compressed state.

(12) The manufacturing method for a power storage module according to above-described (11), in which a resin fiber aggregate is used for the deformable member in the pressing member forming step, and the storage bag opening is closed after a liquid as the fluid has flowed therein in the restoration step.

Advantageous Effects of Invention

According to the present invention, it is possible to provide a power storage module in which good reliability of an electrical connection can be obtained by holding a plurality of power storage cells without rattling and suppressing movement of the power storage cells when an acceleration is input from a lamination direction of the power storage cells, and a manufacturing method for the power storage module.

DESCRIPTION OF EMBODIMENTS

Hereinafter, a power storage module and a manufacturing method for a power storage module of the present invention will be described in detail with reference to the drawings. In the drawings used in the following description, there are cases in which characteristic portions are enlarged for convenience of illustration so that characteristics of the present invention can be easily understood. Therefore, dimensional proportions or the like of respective constituent elements may be different from actual ones. Also, materials, dimensions, and the like illustrated in the following description are merely examples. Therefore, the present invention is not limited only to the embodiments described below and can be appropriately changed and implemented within a scope not changing the requirements of the present invention.

First Embodiment

Figure 1:
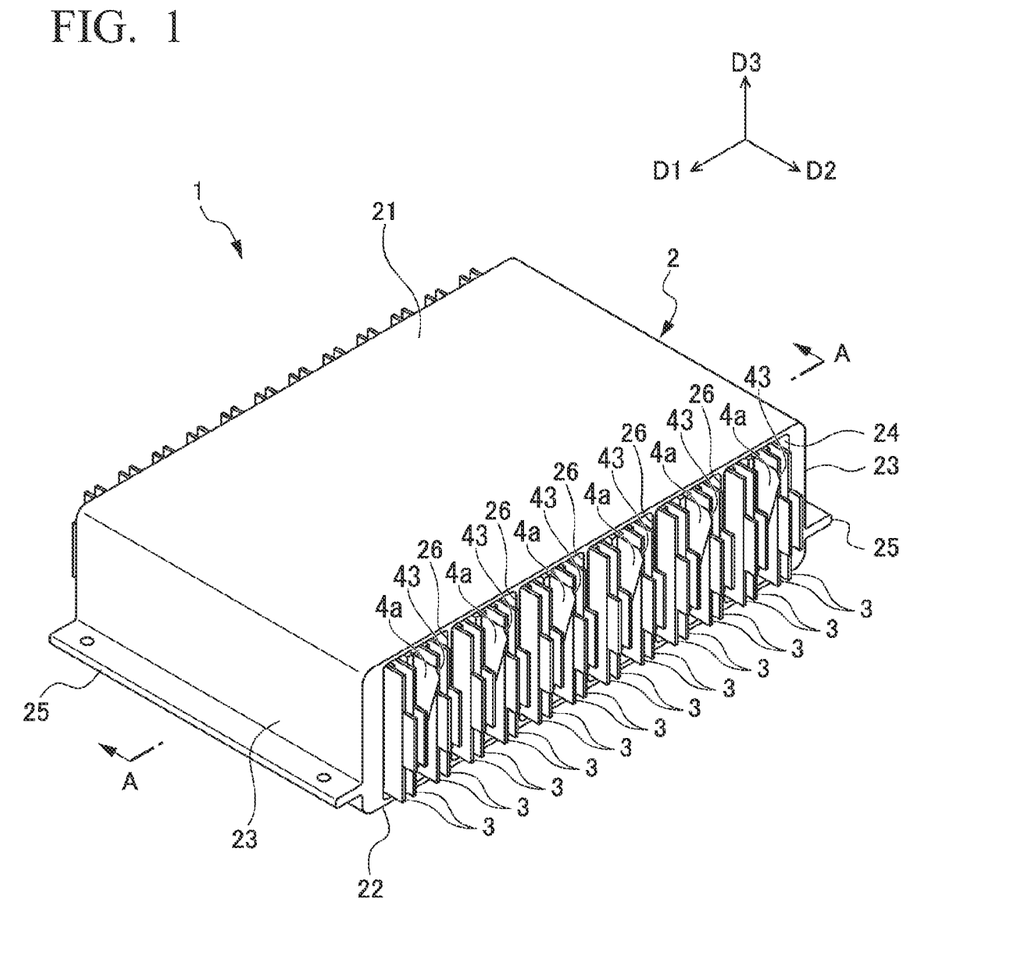
FIG. 1 is a schematic perspective view illustrating a preferred example of a power storage module according to one embodiment of the present invention.
Figure 2:
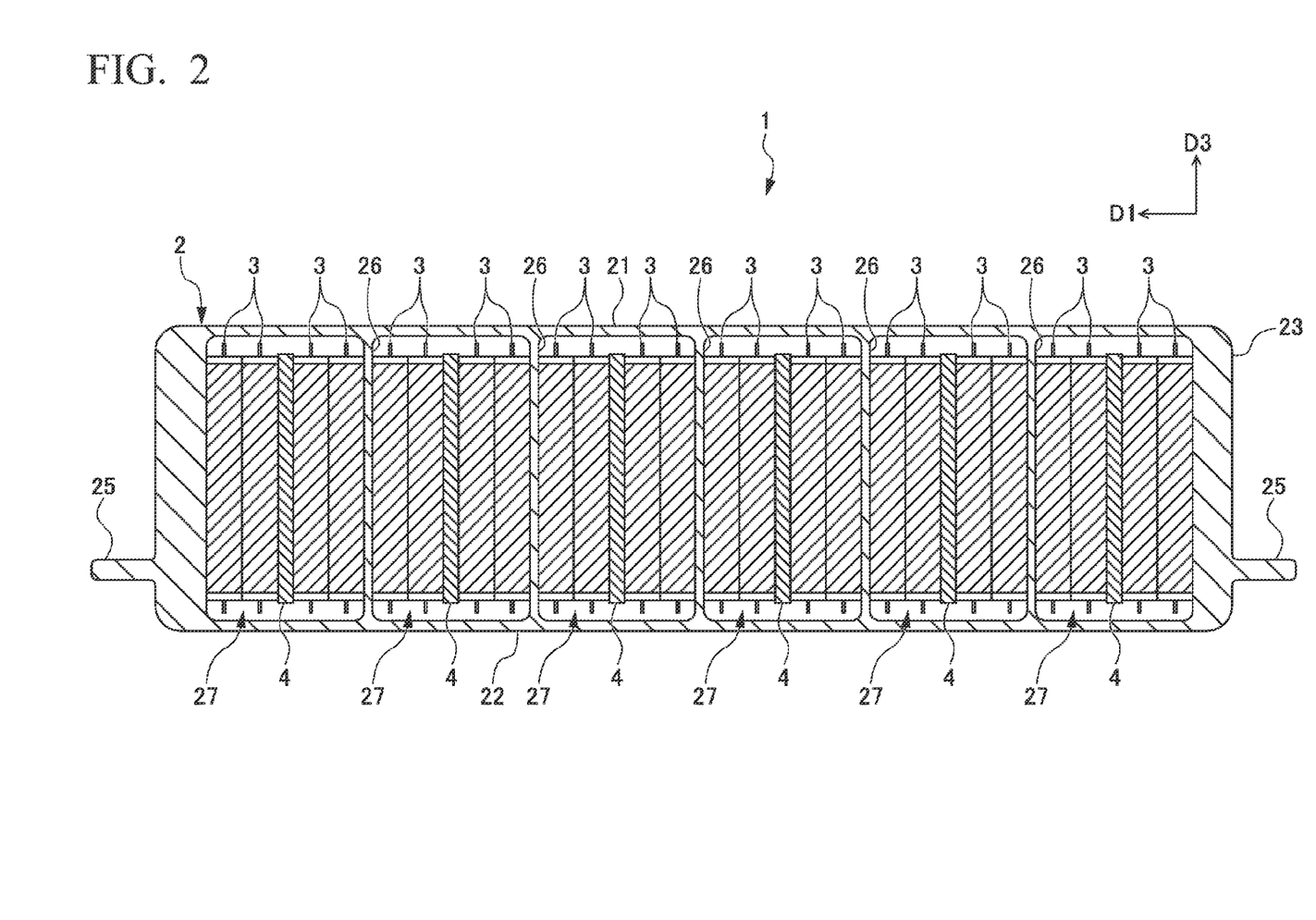
FIG. 2 is a schematic cross-sectional view of the power storage module illustrated in FIG. 1 taken along line A-A.
Figure 3:
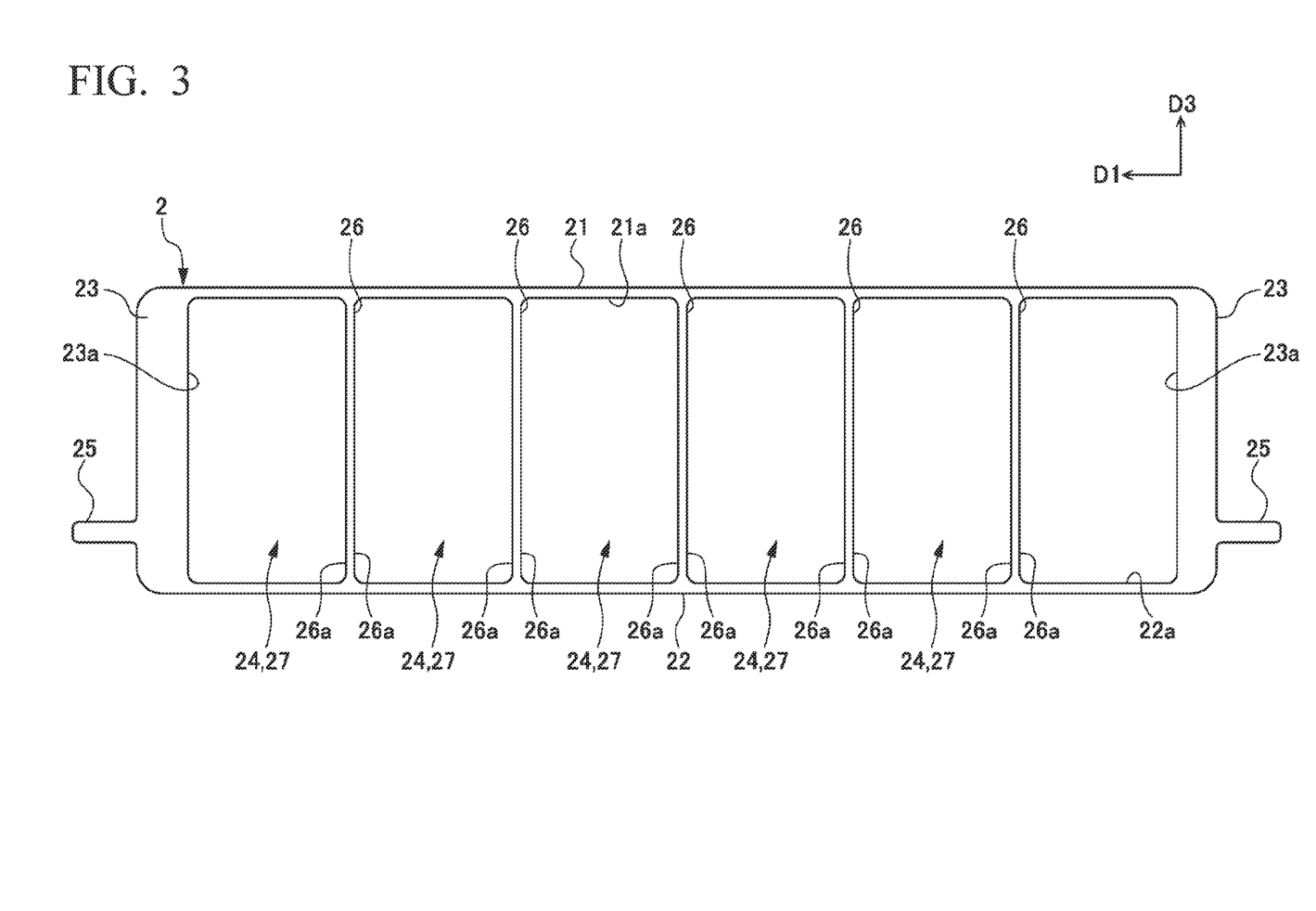
FIG. 3 is a schematic side view illustrating only a cell storage body provided in the power storage module illustrated in FIG. 1.
Figure 4:
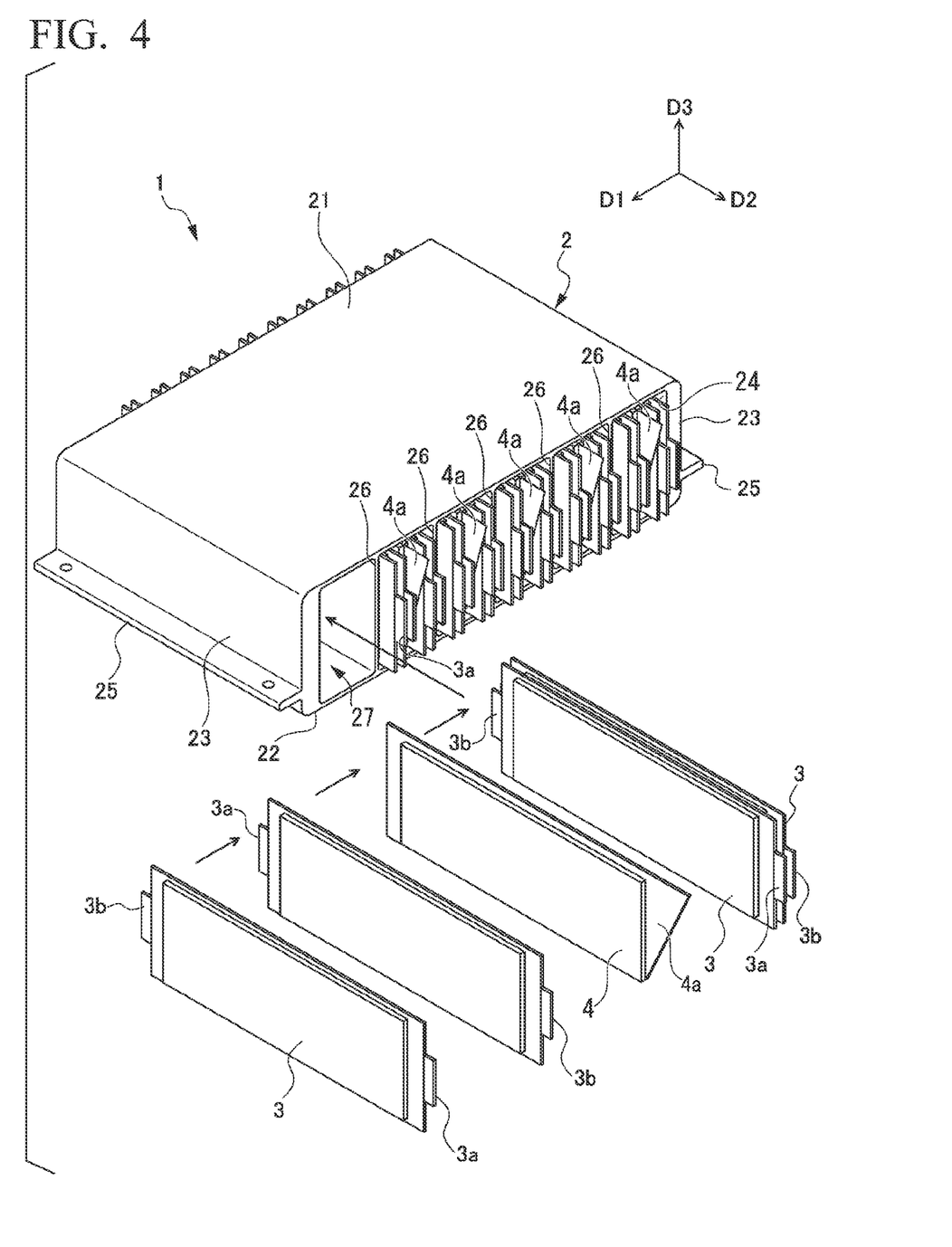
FIG. 4 is a schematic perspective view for explaining a state in which a power storage cell and a pressing member are stored in a cell storage space of the power storage module illustrated in FIG. 1.
Figure 5A:
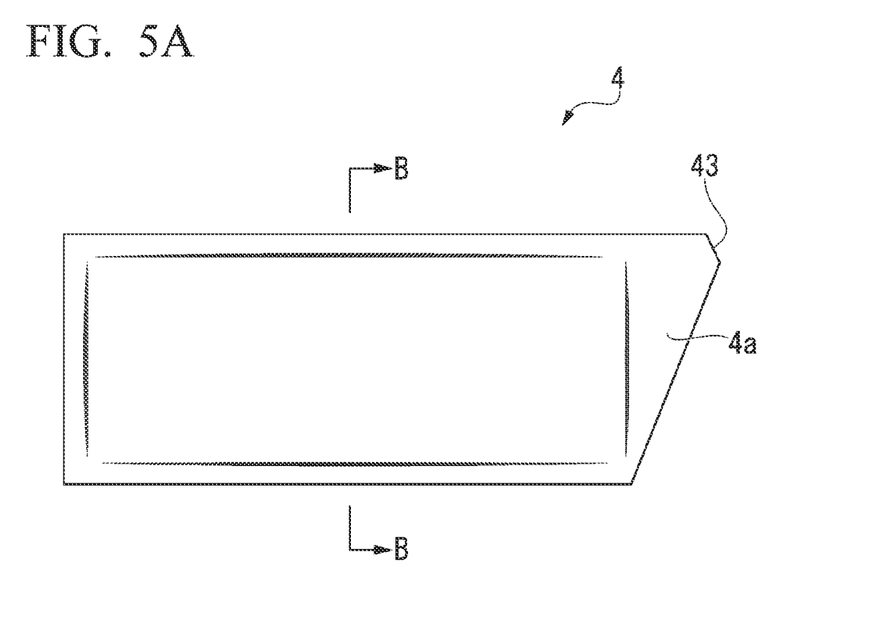
FIG. 5A is a schematic perspective view illustrating an example of the pressing member.
Figure 5B:
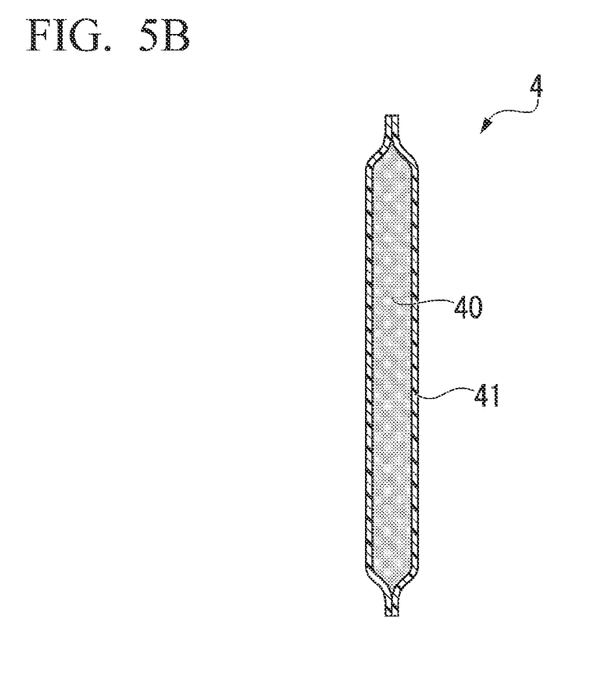
FIG. 5B is a schematic cross-sectional view of FIG. 5A taken along line B-B.

FIG. 1 is a schematic perspective view illustrating a preferred example of a power storage module according to one embodiment of the present invention. FIG. 2 is a schematic cross-sectional view of the power storage module illustrated in FIG. 1 taken along line A-A. FIG. 3 is a schematic side view illustrating only a cell storage body provided in the power storage module illustrated in FIG. 1. FIG. 4 is a schematic perspective view for explaining a state in which a power storage cell and a pressing member are stored in a cell storage space of the power storage module illustrated in FIG. 1. FIG. 5A is a schematic perspective view illustrating an example of the pressing member. FIG. 5B is a schematic cross-sectional view of FIG. 5A taken along line B-B.

A power storage module 1 illustrated in the present embodiment includes a cell storage body 2, a cell storage space 27 disposed in the cell storage body 2, a power storage cell 3 stored in the cell storage space 27, and a pressing member 4 stored in the cell storage space 27 together with the power storage cell 3.

In directions illustrated in FIGS. 1 to 4 and 6 to 8, a D1 direction indicates a length direction of the cell storage body 2. A D2 direction indicates a width direction of the cell storage body 2. A D3 direction indicates a height direction of the cell storage body 2. A direction indicated by the D3 direction is upward with respect to the direction of gravity.

As illustrated in FIG. 1, the cell storage body 2 has a rectangular cylindrical shape. The cell storage body 2 includes a top plate 21 and a bottom plate 22 having a rectangular shape that is longer in the D1 direction, side plates 23 and 23 disposed at both ends of the top plate 21 and the bottom plate 22 in the D1 direction and connecting the top plate 21 and the bottom plate 22, and rectangular openings 24 and 24 that open to both end surfaces of the top plate 21 and the bottom plate 22 in the D2 direction.

Each of the side plates 23 integrally has a plate-shaped flange part 25 protruding in the D1 direction over the entire length in the width direction. The flange part 25 is disposed parallel to the top plate 21 and the bottom plate 22.

As illustrated in FIG. 3, a plurality of (five in the present embodiment) partition plates 26 are provided inside the cell storage body 2. The partition plates 26 are disposed at equal intervals between the side plates 23 and 23. As illustrated in FIG. 3, the partition plates 26 are each integrally provided across an inner wall surface 21a of the top plate 21 and an inner wall surface 22a of the bottom plate 22. Wall surfaces 26a of the partition plates 26 are all parallel to each other. Also, the wall surface 26a of the partition plate 26 and an inner wall surface 23a of the side plate 23 are parallel to each other. Thereby, the cell storage spaces 27 each allowing the power storage cell 3 to be stored are separately formed inside the cell storage body 2 between the parallel wall surfaces 26a and 26a of two adjacent partition plates 26 and 26 and between the wall surface 23a of the side plate 23 and the wall surface 26a of the partition plate 26.

As illustrated in FIG. 3, the cell storage body 2 of the present embodiment has six cell storage spaces 27 separately formed by five partition plates 26. The six cell storage spaces 27 are linearly disposed in a direction (D1 direction) in which the wall surfaces 26a of the partition plates 26 and the wall surfaces 23a of the side plates 23 are aligned. The partition plate 26 extends over the entire length of the cell storage body 2 in the D2 direction. Therefore, the openings 24 and 24 that open to both end surfaces of the cell storage body 2 in the D2 direction are also openings that open in a direction in which the parallel wall surfaces (the wall surfaces 26a of the partition plates 26 and the wall surfaces 23a of the side plates 23) of the cell storage spaces 27 extend.

In the cell storage body 2, the top plate 21, the bottom plate 22, the side plate 23, the flange part 25, and the partition plate 26 are all preferably formed of a metal material with good heat conductivity such as aluminum or an aluminum alloy. Since the cell storage body 2 has a uniform shape in the D2 direction, it can be made as an integrally molded product by impact molding or extrusion molding in the D2 direction. Therefore, the cell storage body 2 has good strength and heat conductivity. Also, when the cell storage body 2 is an integrally molded product, since it is not necessary to assemble separately formed parts, the number of parts of the cell storage body 2 can be reduced and costs can be reduced.

(Power Storage Cell)

The power storage cell 3 stores a battery element (not illustrated) having a positive electrode plate and a negative electrode plate therein. As illustrated in FIG. 4, the power storage cell 3 is flat in the D1 direction. The power storage cell 3 has a laterally elongated rectangular shape having a height slightly smaller than a height of the cell storage space 27 and a width (width in the D2 direction) slightly larger than a width of the cell storage space 27.

As the power storage cell 3, a conventionally known one can be used. As the power storage cell 3, for example, one having a laminate pack shape in which a battery element is sealed in an exterior body made of a laminate film, one in which a battery element is stored in an exterior body made of a metal, or the like can be used. As the laminate film, it is preferable to use a metal foil composite laminate film in which a metal foil and a resin film are bonded together. As the metal foil composite laminate film, known ones can be used. For example, as the metal foil, one made of a metal such as aluminum, an aluminum alloy, stainless steel, and/or a nickel alloy can be used. As the resin film, one made of a resin such as polyethylene, ethylene vinyl acetate, and/or polyethylene terephthalate can be used.

As the power storage cell 3, one in which a battery element such as a lithium-ion secondary battery and an electrolytic solution are stored in an exterior body may be used, and one in which a battery element made of an all-solid-state battery having no electrolyte solution is stored in an exterior body may be used.

In the present embodiment, as the power storage cell 3, one having a laminate pack shape is used as illustrated in FIG. 4. As illustrated in FIG. 4, a positive electrode terminal 3a electrically connected to the positive electrode plate of the battery element is provided to protrude on one end of the power storage cell 3 in the width direction (D2 direction). Also, a negative electrode terminal 3b electrically connected to the negative electrode plate of the battery element is provided to protrude on the other end of the power storage cell 3 in the width direction (D2 direction).

The power storage cell 3 is disposed so that the positive electrode terminal 3a and the negative electrode terminal 3b are disposed in a lateral direction (direction in the D2 direction). The power storage cells 3 are inserted through the opening 24, and four power storage cells 3 are stored in one cell storage space 27 (see FIG. 4). Therefore, in the cell storage body 2, a total of 24 power storage cells 3 are distributed to be stored in six cell storage spaces 27.

The positive electrode terminal 3a of the power storage cell 3 in the cell storage space 27 is disposed in one of the openings 24 and 24 of each cell storage space 27. Also, the negative electrode terminal 3b of the power storage cell 3 is disposed in the other of the openings 24 and 24 of each cell storage space 27 (see FIG. 4). The positive electrode terminal 3a and the negative electrode terminal 3b of each power storage cell 3 are each exposed from the opening 24 and extend outward in the width direction (D2 direction) of the power storage cell 3. In the present embodiment, since the positive electrode terminal 3a and the negative electrode terminal 3b of each power storage cell 3 are disposed apart from each other, a current distribution of the power storage cell 3 is made uniform and deterioration in performance of the power storage cell 3 is suppressed.

In the present embodiment, the positive electrode terminals 3a and the negative electrode terminals 3b of adjacent power storage cells 3 and 3 are disposed in opposite directions to each other. That is, the positive electrode terminal 3a of the power storage cell 3 and the positive electrode terminal 3b of the power storage cell 3 adjacent thereto are adjacent to each other. Therefore, the positive electrode terminals 3a and the negative electrode terminals 3b protruding from the opening 24 of each cell storage space 27 are alternately disposed in the D1 direction of the cell storage body 2 (see FIG. 4).

In the present embodiment, the positive electrode terminals 3a and the negative electrode terminals 3b of adjacent power storage cells 3 and 3 are electrically connected by a bus bar (not illustrated). Also, the positive electrode terminals 3a and the negative electrode terminals 3b of the power storage cells 3 and 3 may be electrically connected to an external device by a harness (not illustrated).

Further, in the present embodiment, all the power storage cells 3 in the cell storage body 2 are preferably connected in series by a bus bar. However, all the power storage cells 3 in the cell storage body 2 may be connected in parallel by aligning directions of the positive electrode terminals 3a and the negative electrode terminals 3b of the power storage cells 3.

(Pressing Member)

As illustrated in FIGS. 5A and 5B, the pressing member 4 includes a deformable member 40 made of an elastic body or a structure having expansibility and a storage bag 41 in which the deformable member 40 is stored. The storage bag 41 is deformed according to a change in shape of the deformable member 40. The storage bag 41 can be sealed by closing a storage bag opening 43 provided at an edge portion 4a of the pressing member 4. Further, when the storage bag opening 43 is closed, a timing thereof can be arbitrarily selected.

As illustrated in FIGS. 4, 5A, and 5B, the pressing member 4 is formed in a rectangular or substantially rectangular sheet shape similarly to the power storage cell 3. As illustrated in FIG. 4, the pressing member 4 has a laterally elongated rectangular shape having a height slightly smaller than the height of the cell storage space 27 and a width (width in the D2 direction) slightly larger than the width of the cell storage space 27.

As illustrated in FIGS. 2 and 4, one pressing member 4 is stored in each cell storage space 27. The pressing member 4 is stored in each cell storage space 27 in a state of being laminated with the power storage cell 3, and is disposed to face the wall surfaces (the wall surface 26a of the partition plate 26 and the wall surface 23a of the side plate 23) of the cell storage space 27 via the power storage cell 3. In the present embodiment, the pressing member 4 is sandwiched between two central power storage cells 3 and 3 to partition the four power storage cells 3 stored in each cell storage space 27 into two of two power storage cells 3.

In the present embodiment, as illustrated in FIG. 1, the edge portion 4a of the pressing member 4 is exposed from one of the openings 24 and 24 of each cell storage space 27. As illustrated in FIG. 5A, in the edge portion 4a on the edge of the pressing member 4, the edge portion 4a on one side in the width direction (D2 direction) of the power storage cell 3 is formed such that one side (upper side in FIGS. 1 and 5A) thereof in the width direction of the cell storage space 27 extends outward, and one side thereof in a height direction of the cell storage space 27 is inclined with respect to the height direction of the cell storage space 27. Thereby, the edge portion 4a has a substantially triangular shape.

As illustrated in FIGS. 1 and 5A, the storage bag opening 43 formed to be cut so that a vicinity of an apex of the substantially triangular shape of the edge portion 4a is chamfered is provided in the edge portion 4a exposed from the opening 24. As illustrated in FIG. 1, the storage bag opening 43 is disposed at a position that does not overlap the positive electrode terminal 3a or the negative electrode terminal 3b when viewed from a thickness direction of the power storage cell 3. Therefore, the power storage module 1 of the present embodiment has a configuration in which the positive electrode terminal 3a or the negative electrode terminal 3b does not become a disturbance when the edge portion 4a exposed from the opening 24 of the cell storage space 27 is cut to open the storage bag 41 in a restoration step to be described later, and thus this is preferable.

In the present embodiment, the case in which the edge portion 4a of the pressing member 4 exposed from the opening 24 has a substantially triangular shape has been described as an example, but a shape of the edge portion 4a is not limited to a substantially triangular shape. The shape of the edge portion 4a of the pressing member 4 exposed from the opening 24 may be, for example, a shape in which both sides thereof in the width direction of the cell storage space 27 are made longer than the width of the cell storage space 27.

Further, a shape of the storage bag opening 43 is not limited to the examples illustrated in FIGS. 1 and 5A. The above-described shape may be, for example, a hole, a notch, or the like having an arbitrary planar shape penetrating the edge portion 4a of the pressing member 4.

In the power storage module 1 of the present embodiment, regardless of a shape of the edge portion 4a of the pressing member 4 exposed from the opening 24 and a shape of the storage bag opening 43, the storage bag opening 43 is preferably disposed at a position that does not overlap the positive electrode terminal 3a or the negative electrode terminal 3b when viewed from the thickness direction of the power storage cell 3.

The storage bag 41 is preferably formed of a metal foil composite laminate film in which a metal foil and a resin film are bonded together, or a resin film. As the metal foil composite laminate film, known ones can be used. For example, as the metal foil, one made of a metal such as aluminum, an aluminum alloy, stainless steel, and/or a nickel alloy can be used. As the resin film, one made of a resin such as polyethylene, ethylene vinyl acetate, and/or polyethylene terephthalate can be used.

When the storage bag 41 is formed of a metal foil composite laminate film or a resin film, the pressing member 4 can be utilized as an insulator. Particularly, when the power storage cell 3 uses an exterior body made of a metal cell can, the pressing member 4 can be utilized as an insulator between the power storage cells 3 and 3 adjacent to each other with the pressing member 4 interposed therebetween, and this is preferable.

As the elastic body used for the deformable member 40 of the pressing member 4, for example, a foamed body made of rubber, a resin, or the like can be used. When the deformable member 40 is of a foamed body, a pressing force against the power storage cell 3 and an absorption status of an expansion force of the power storage cell 3 can be easily adjusted by appropriately setting an expansion ratio of the foamed body. Also, when the deformable member 40 is of a foamed body, a weight and costs of the power storage module 1 can be further reduced.

As the structure having a swelling property used for the deformable member 40, for example, a structure that swells by being impregnated with a liquid can be used. As the structure that swells by being impregnated with a liquid, a resin fiber aggregate is preferably used. As a specific example of the resin fiber aggregate, a laminate of nonwoven fabrics made of polyolefin-based resin fibers and phenol resin fibers can be stated. As the polyolefin-based resin fibers, polypropylene fibers or the like can be used. When phenol resin fibers are used for the resin fiber aggregate, the deformable member 40 has excellent heat resistance, and thus this is preferable. The structure that swells by being impregnated with a liquid is preferably used in combination with a liquid.

When the deformable member 40 is of a resin fiber aggregate, a pressing force against the power storage cell 3 and an absorption status of the expansion force of the power storage cells 3 can be easily adjusted by appropriately adjusting densities, types, diameters, lengths, shapes, or the like of fibers forming the resin fiber aggregate. Also, when the deformable member 40 is of a resin fiber aggregate, a weight and costs of the power storage module 1 can be further reduced similarly to with the foamed body.

In the present embodiment, a fluid contained in the storage bag 41 may be sealed into the storage bag 41 by heat sealing and closing the storage bag opening 43. As the fluid, a gas may be used or a liquid may be used. When a resin fiber aggregate, which is a structure that swells by being impregnated with a liquid, is used as the deformable member 40, a liquid is preferably used as the fluid.

When the fluid sealed in the storage bag 41 is a gas, air is preferably used. A gas such as carbon dioxide or nitrogen may be used instead of or together with air.

Also, when the fluid sealed in the storage bag 41 is a liquid, water is preferably used. A liquid such as ethylene glycol, an organic solvent, an insulation oil, or a fluorine-based inert liquid may be used instead of or together with water.

As illustrated in FIGS. 1 and 2, each pressing member 4 applies a pressing force toward the wall surface 26*a* of the cell partition plate 26 or the wall surface 23*a* of the side plate 23 with respect to the four power storage cells 3 stored in the same cell storage space 27 as each pressing member 4. That is, each pressing member 4 presses two power storage cells 3 disposed on both sides of the pressing member 4 in the same cell storage space 27 toward the wall surface 26*a* of the partition plate 26 or the wall surface 23*a* of the side plate 23 with a predetermined pressing force. With this configuration, the four power storage cells 3 in each cell storage space 27 are held in the power storage module 1 without rattling in each cell storage space 27.

Also, when the pressing member 4 is provided, the two parallel wall surfaces 26*a* and 26*a* or the wall surface 26*a* and the wall surface 23*a* that form the cell storage space 27 can be effectively utilized as heat transfer surfaces. That is, the power storage cell 3 is pressed against the wall surface 26*a* of the partition plate 26 or the wall surface 23*a* of the side plate 23 by the pressing member 4. Thereby, thermal contact resistance between the power storage cell 3 and the wall surfaces 23*a* and 26*a* decreases, and thus heat exchange between the power storage cell 3 and the wall surfaces 23*a* and 26*a* is promoted.

Also, the deformable member 40 of the pressing member 4 is compressed by the expansion force of the power storage cell 3 when the power storage cell 3 in the cell storage space 27 expands due to charging and discharging. Thereby, the pressing member 4 reduces a load on the wall surface 26*a* of each partition plate 26 and the wall surface 23*a* of the side plate 23 when the power storage cell 3 expands, and reduces a load on the cell storage body 2 due to the expansion of the power storage cells 3. As described above, in the present embodiment, the deformable member 40 of the pressing member 4 is compressed, and the pressing load on the cell storage body 2 due to the expansion of the power storage cell 3 is canceled out. Therefore, strengths of the wall surface 26*a* of the partition plate 26 and the wall surface 23*a* of the side plate 23 can be set to be low, and thus a weight and costs of the power storage module 1 can be reduced.

(Manufacturing Method for Power Storage Module)

Next, a manufacturing method for the power storage module of the present embodiment will be described in detail by taking preferred examples.

First, the cell storage body 2 which is an integrally molded product is manufactured by impact molding or extrusion molding. Also, the power storage cell 3 is manufactured using a conventionally known method.

Next, two laterally elongated rectangular metal foil composite laminate films corresponding to a shape of the storage bag 41 of the pressing member 4 are prepared, and two long sides and one short side are heat sealed and joined to form the storage bag 41 with one short side open. The storage bag 41 with one short side open may also be formed by heat sealing both ends of a strip-shaped metal foil composite laminate film to form it into a cylindrical shape and heat sealing and joining one end of the cylindrical metal foil composite laminate film.

Next, the deformable member 40 made of an elastic body or a structure having expansibility is stored in the storage bag 41. Next, the deformable member 40 is compressed by reducing a pressure of the inside of the storage bag 41. Thereafter, the opening of the storage bag 41 is heat-sealed and joined to seal the storage bag 41 and form a predetermined shape of the edge portion 4*a*. In the present embodiment, a shape of one edge portion 4*a* in the width direction (D2 direction) of the power storage cell 3 of the pressing member 4 is a substantially triangular shape (see FIG. 4) in which one side thereof in the width direction of the cell storage space 27 extends outward, and one side thereof in the height direction of the cell storage space 27 is inclined with respect to the height direction of the cell storage space 27.

With the above step, the sheet-shaped pressing member 4 is formed (pressing member forming step).

Next, as illustrated in FIG. 4, the power storage cells 3 and the pressing member 4 are laminated and stored in the cell storage space 27 that has parallel wall surfaces disposed in the cell storage body 2 (lamination step). In the present embodiment, two of the power storage cells 3, the pressing member 4, and two of the power storage cells 3 that are laminated in that order are inserted into each cell storage space 27 from the opening 24 to be stored.

In the present embodiment, when the pressing member 4 is laminated with the power storage cells 3 and stored in the cell storage space 27, the deformable member 40 of the pressing member 4 is in a compressed state. Therefore, a thickness of the laminate formed of the pressing member 4 and the power storage cells 3 is smaller than the width of the cell storage space 27. Thereby, when the power storage module 1 of the present embodiment is manufactured, the laminate formed of the pressing member 4 and the power storage cells 3 can be easily inserted into the cell storage space 27 and can be efficiently fabricated.

Next, in the present embodiment, the edge portion 4*a* exposed from the opening 24 of the cell storage space 27 is cut to open the storage bag 41 and form the storage bag opening 43 (see FIG. 1). Thereby, air serving as a fluid flows into the storage bag 41 through the storage bag opening 43. Then, the deformable member 40 is restored and expands from the compressed state in the storage bag 41, and a volume of the deformable member 40 increases. As a result, the pressing member 4 applies a pressing force to the wall surfaces (the wall surface 26*a* of the partition plate 26 and the wall surface 23*a* of the side plate 23) with respect to the power storage cell 3 (restoration step).

A method of cutting the edge portion 4*a* to open the storage bag 41 can be arbitrarily selected, and conventionally known methods such as, for example, a method of removing a part of the edge portion 4*a* by shearing or making a cut at a part of the edge portion 4*a*, a method of making a hole at a part of the edge portion 4*a* by punching, and the like can be used.

In the present embodiment, the pressing member 4 having the compressed deformable member 40 and the power storage cell 3 are laminated, and the laminated body is stored in the cell storage space 27. Thereafter, the storage bag 41 is made to open, and the pressing member 4 is expanded in the thickness direction (D1 direction) inside the cell storage space 27. By this method, the pressing member 4 presses the power storage cells 3 against the wall surface 26*a* of the partition plate 26 or the wall surface 23*a* of the side plate 23, and the power storage cells 3 in the cell storage space 37 are reliably held without rattling. Further, the pressing member 4 does not hold the power storage cells 3 by adhering the power storage cells 3 with an adhesive. Therefore, the power storage module 1 of the present embodiment is easy to disassemble and is excellent in recyclability.

In the present embodiment, the storage bag opening 43 formed by opening the storage bag 41 may be closed after air is caused to flow into the storage bag 41. A timing for closing the storage bag opening 43 can be appropriately adjusted as long as it is after the storage bag 41 is opened to form the storage bag opening 43. The storage bag opening 43 can be closed by, for example, a method of heat sealing and joining. When the storage bag opening 43 is closed after air is caused to flow into the storage bag 41, a thickness of the pressing member 4 in the cell storage space 27 can be adjusted according to an amount of the air that is caused to flow into the storage bag 41, and a magnitude of the force for pressing the power storage cell 3 against the wall surfaces 23a and 26a can be adjusted.

In the manufacturing method for the power storage module 1 of the present embodiment, when a resin fiber aggregate, which is a structure that swells by being impregnated with a liquid, is used as the deformable member 40 in the pressing member forming step described above, the storage bag opening 43 is preferably closed after injecting a liquid as a fluid into the storage bag 41 through the storage bag opening 43 formed by opening the storage bag 41 in the restoration step.

In this case, when the storage bag 41 is opened, the resin fiber aggregate serving as the deformable member 40 is restored and expands from the compressed state in the storage bag 41, and further swells by being impregnated with the liquid to increase the volume. As a result, the pressing member 4 applies a pressing force to the wall surfaces with respect to the power storage cell 3. Also, a thickness of the pressing member 4 in the cell storage space 27 can be adjusted according to an amount of the liquid flowing into the storage bag 41, and a magnitude of the force for pressing the power storage cell 3 against the wall surfaces 23a and 26a can be adjusted. Also, when the liquid is injected into the storage bag 41 and the storage bag opening 43 is closed, the pressing force of the pressing member 4 against the wall surface with respect to the power storage cell 3 is less susceptible to a change in atmospheric pressure and is stable, and this is preferable.

The power storage module 1 of the present embodiment includes the sheet-shaped pressing member 4 disposed to face the wall surfaces (the wall surface 26a of the partition plate 26 and the wall surface 23a of the side plate 23) of the cell storage space 27 via the power storage cell 3 and configured to apply a pressing force to the wall surfaces with respect to the power storage cell 3. Therefore, in the power storage module 1 of the present embodiment, a plurality of power storage cells 3 are held without rattling due to the effect of the pressing member 4, and movement of the power storage cells 3 when an acceleration is input from a lamination direction of the power storage cells 3 is suppressed. Therefore, the power storage module 1 of the present embodiment has good reliability of an electrical connection.

In the manufacturing method for the power storage module 1 of the present embodiment, the deformable member 40 is compressed and sealed by reducing a pressure of the inside of the storage bag 41 in the pressing member forming step, the power storage cells 3 and the pressing member 4 are laminated and stored in the cell storage space 27 in the lamination step, and the storage bag 41 is opened and a fluid is caused to flow into the storage bag 41 to restore the deformable member 40 from the compressed state in the restoration step. Therefore, it is possible to obtain the power storage module 1 of the present embodiment in which the plurality of power storage cells 3 are held without rattling and movement of the power storage cells 3 when an acceleration is input from the lamination direction of the power storage cells 3 is suppressed.

Figure 6:
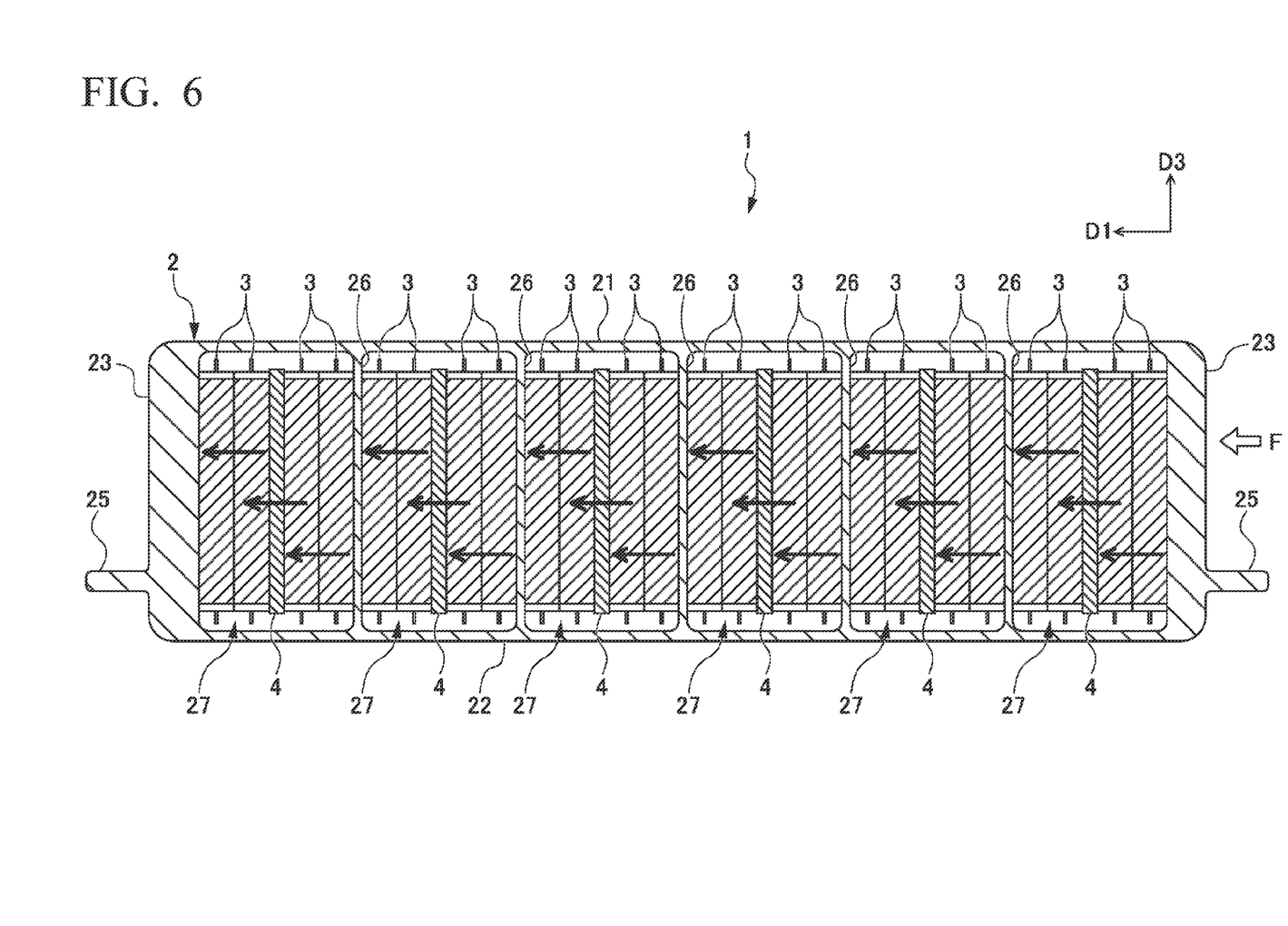
FIG. 6 is a view illustrating effects of the power storage module according to the present invention.

Here, specific effects of storing the 24 power storage cells 3 in the cell storage body 2 provided in the power storage module 1 of the present embodiment in a distributed manner in the six cell storage spaces 27 will be described. FIG. 6 is a view illustrating effects of the power storage module according to the present invention.

For example, when a collision load F is input to the power storage module 1 mounted on a vehicle (not illustrated) in a direction (D1 direction) in which the power storage cells 3 are aligned, the collision load F acts to move all the power storage cells 3 in the cell storage body 2 in an input direction (D1 direction) of the collision load F.

For example, in the power storage module, it is assumed that the inside of the cell storage body is not divided by the partition plate, and one pressing member is disposed at a center to divide the 24 power storage cells into two by 12 each. In this power storage module, an amount of movement of a power storage cell disposed on an input side of the collision load F (right end side in the case of FIG. 6) is largest, and a power storage cell disposed on a side (left end side in the case of FIG. 6) opposite to the input side of the collision load F receives loads of the other 23 power storage cells and is greatly compressed.

Here, when a spring constant of the power storage cell is k, a spring constant of the pressing member is h, an input acceleration is a, and a mass of the power storage cell is m, an amount of maximum movement of the power storage cell (amount of movement of the power storage cell disposed on the input side of the collision load F) is $(23\,ma+22\,ma+21\,ma+\ldots+ma)/k+12\,ma/h=276\,ma/k+12\,ma/h$.

In contrast, in the power storage module 1 of the present embodiment in which the 24 power storage cells 3 in the cell storage body 2 are distributed and stored in the six cell storage spaces 27, an amount of movement of the power storage cells 3 is limited by the five partition plates 26. Therefore, a maximum amount of movement of the power storage cell 3 is $(3\,ma+2\,ma+ma)/k+2\,ma/h=6\,ma/k+2\,ma/h$. Therefore, in the power storage module 1 of the present embodiment, the maximum amount of movement of the power storage cell 3 is significantly reduced as compared with the above-described case. As a result, when an acceleration due to the collision load F is input, a load applied to an electrical connection portion between the power storage cells 3 and 3 and an electrical connection portion between the power storage cell 3 and the outside is reduced, and reliability of the electrical connection of the power storage cell 3 improves.

In the power storage module 1 of the present embodiment, at least one of a heat sink, a temperature control device, and a temperature measurement device may be provided on an outer surface (outer surface of the top plate 21, the bottom plate 22, and the side plate 23) of the cell storage body 2.

Since the cell storage body 2 in the present embodiment is an integrally molded product made of a metal material, heat conductivity thereof is satisfactory. Thereby, in the present embodiment, temperatures of the wall surfaces 23a and 26a in the cell storage space 27 and a temperature of the outer surface of the cell storage body 2 are made uniform. Therefore, in the present embodiment, a heat sink, a temperature control device, and a temperature measurement device can be easily mounted on the outer surface of the cell storage body 2, and improvement in efficiency of assembling these and reduction in assembling costs can be easily achieved.

Figure 7:
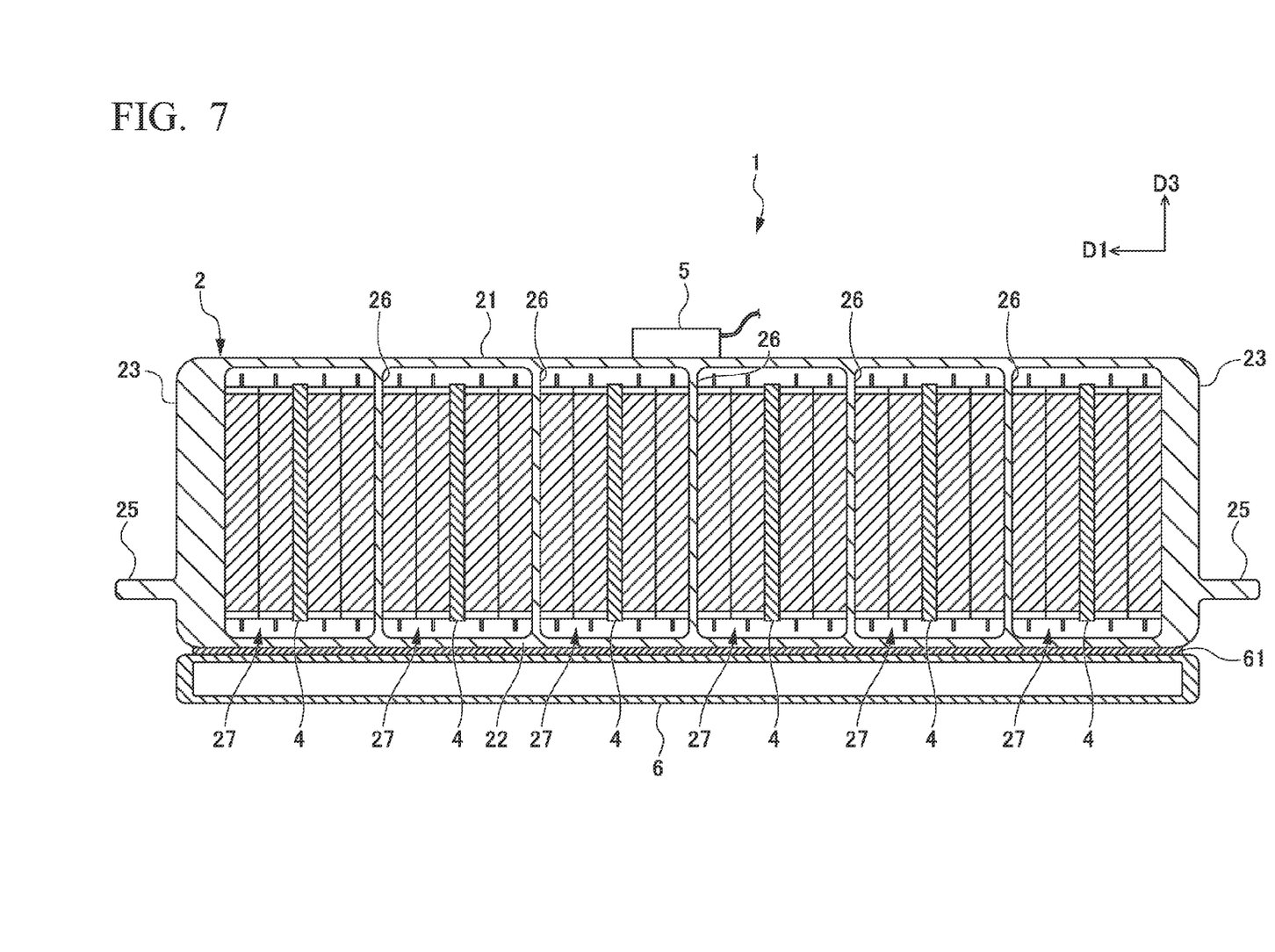
FIG. 7 is a schematic cross-sectional view illustrating a state in which a temperature control device and a temperature measurement device are attached to the power storage module illustrated in FIG. 1.

FIG. 7 is a schematic cross-sectional view illustrating a state in which a temperature control device and a temperature measurement device are attached to the power storage module illustrated in FIG. 1. As illustrated in FIG. 7, a temperature sensor 5 as a temperature measurement device is provided on the top plate 21 of the cell storage body 2. In the power storage module 1 of the present embodiment, since temperatures of the wall surfaces 23a and 26a in the cell storage space 27 and the outer surface of the cell storage body 2 are made uniform, a temperature of the power storage cell 3 in each cell storage space 27 can be indirectly measured with one temperature sensor 5. Also, a water jacket 6 as a temperature control device is provided on the bottom plate 22 of the cell storage body 2. The water jacket 6 is made of a hollow member which is formed of a metal such as aluminum and in which a passage through which a refrigerant such as water, cooling air, or the like flows therein is formed therein. As illustrated in FIG. 7, a heat transfer sheet 61 is preferably disposed between the water jacket 6 and the bottom plate 22. In the power storage module 1 of the present embodiment, the power storage cell 3 in each cell storage space 27 can be efficiently cooled by the water jacket 6 via the heat transfer sheet 61 and the bottom plate 22.

Second Embodiment

Next, an example of another embodiment of a power storage module according to the present invention will be described.

Figure 8:
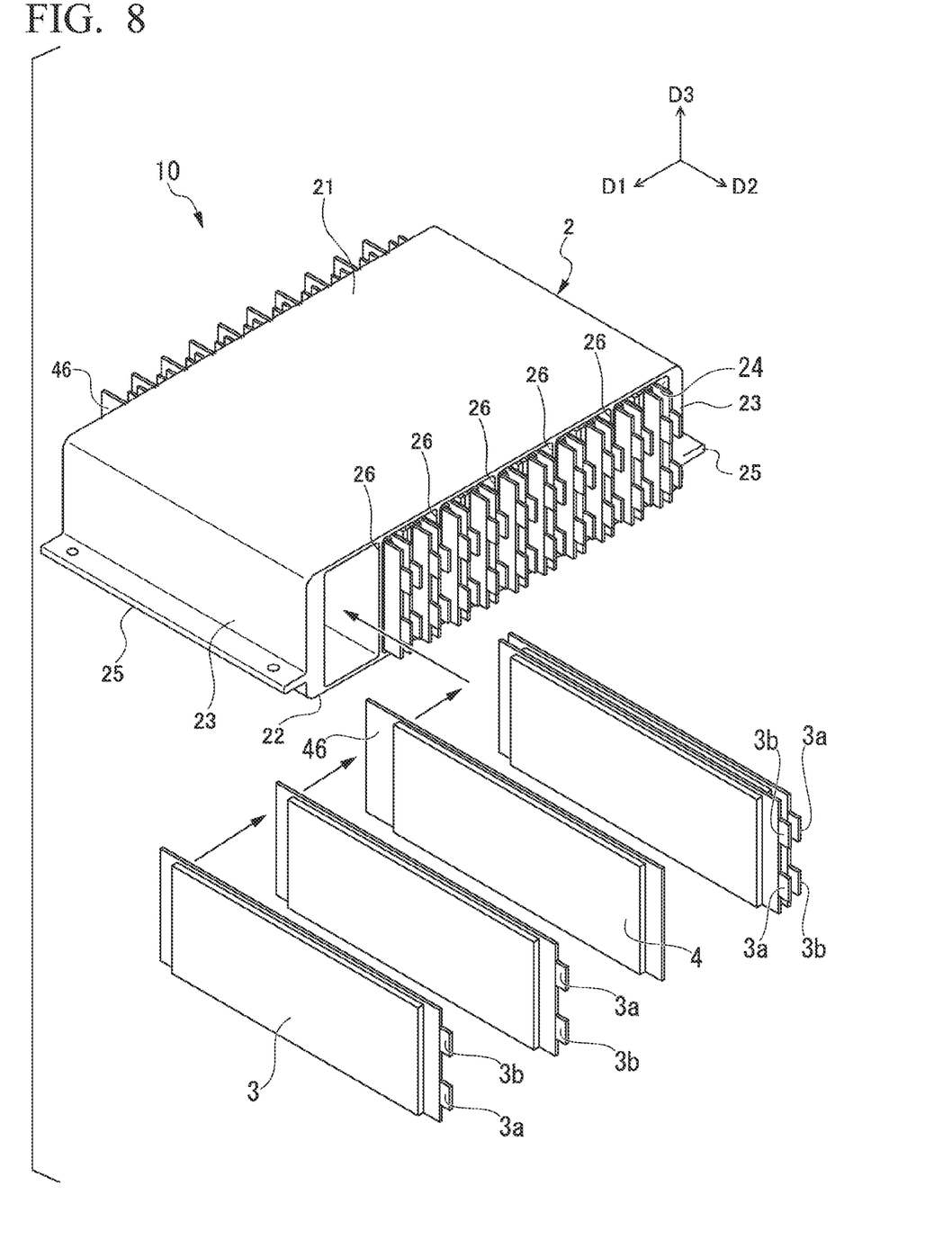
FIG. 8 is a schematic perspective view for explaining a state in which a power storage cell and a pressing member are stored in a cell storage space of an example of a power storage module according to another embodiment of the present invention.

FIG. 8 is a schematic perspective view for explaining a state in which a power storage cell and a pressing member are stored in a cell storage space of a power storage module according to another embodiment of the present invention. In a power storage module 10 of the second embodiment illustrated in FIG. 8, members the same as those in the power storage module 1 of the first embodiment are denoted by the same reference signs, and description thereof will be omitted.

In the power storage module 10 of the second embodiment, unlike the power storage module 1 of the first embodiment, a positive electrode terminal 3a and a negative electrode terminal 3b of a power storage cell 3 are disposed only in one of openings 24 and 24 of a cell storage space 27 as illustrated in FIG. 8. Then, as illustrated in FIG. 8, an edge portion 46 of a pressing member 4 is exposed from the opening 24 of the cell storage space 27 on a side in which the positive electrode terminal 3a and the negative electrode terminal 3b of the power storage cell 3 are not disposed. In an edge portion 4a on an edge of the pressing member 4, one edge portion 4a (46) of the power storage cell 3 in a width direction (D2 direction) has a shape in which lengths of both sides thereof in the width direction of the cell storage space 27 are made larger than a width of the cell storage space 27 as illustrated in FIG. 8. The pressing member 4 is a rectangle that is longer in the D2 direction.

A storage bag opening (not illustrated in FIG. 8) extending throughout in a height direction of the cell storage space 27 is provided at the edge portion 46 exposed from the opening 24. That is, in the power storage module 10 of the second embodiment, the storage bag opening is provided at the edge portion 46 exposed from the opening 24 on a side in which the positive electrode terminal 3a and the negative electrode terminal 3b are not disposed. Therefore, in the power storage module 10 of the second embodiment, the positive electrode terminal 3a or the negative electrode terminal 3b does not become a disturbance when the edge portion 46 exposed from the opening 24 of the cell storage space 27 is cut to form the storage bag opening and open a storage bag 41 in a restoration step to be described later, and thus this is preferable.

Next, a manufacturing method for the power storage module 10 of the second embodiment will be described in detail. First, a cell storage body 2 and the power storage cell 3 are manufactured in the same manner as the manufacturing method for the power storage module 1 of the first embodiment.

Next, the storage bag 41 with one short side open is formed and a deformable member 40 is stored in the storage bag 41 in the same manner as in the manufacturing method for the power storage module 1 of the first embodiment. Next, the deformable member 40 is compressed, the storage bag 41 is sealed, and a predetermined shape of the edge portion 4a is formed in the same manner as in the first embodiment.

At this time, in the power storage module 10 of the second embodiment, unlike the power storage module 1 of the first embodiment, one edge portion 4a (46) of the pressing member 4 in the width direction (D2 direction) of the power storage cell 3 has a shape in which lengths of both sides thereof in the width direction of the cell storage space 27 are sufficiently larger than the width of the cell storage space 27 (width in an X direction). With the above steps, the sheet-shaped pressing member 4 is formed (pressing member forming step).

Next, a lamination step and a restoration step are performed in that order in the same manner as in the manufacturing method for the power storage module 1 of the first embodiment.

Thereafter, also in the second embodiment, as in the first embodiment, the storage bag opening formed by opening the storage bag 41 may be closed after a fluid is caused to flow into the storage bag 41.

Similarly to the power storage module 1 of the first embodiment, the power storage module 10 of the present embodiment includes the sheet-shaped pressing member 4 disposed to face wall surfaces (a wall surface 26a of a partition plate 26 and a wall surface 23a of a side plate 23) of the cell storage space 27 via the power storage cell 3 and configured to apply a pressing force to the wall surfaces with respect to the power storage cell 3. Therefore, also in the power storage module 10 of the present embodiment, a plurality of power storage cells 3 are held without rattling and movement of the power storage cells 3 when an acceleration is input from a lamination direction of the power storage cells 3 is suppressed. Therefore, the power storage module 1 of the present embodiment has good reliability of an electrical connection.

While embodiments of the present invention have been described above, various modifications can be made in design within the scope not departing from the gist of the present invention.

For example, in the above-described embodiments, a case in which six cell storage spaces are linearly disposed in the cell storage body 2 in a direction in which parallel wall surfaces thereof are aligned has been described as an example, but the number of the cell storage spaces disposed in the cell storage body is not limited to six, and may be one to five or seven or more.

INDUSTRIAL APPLICABILITY

It is possible to provide a power storage module with good reliability of an electrical connection in which a plurality of power storage cells are held without rattling and movement of the power storage cells when an acceleration is input from a lamination direction of the power storage cells is suppressed, and a manufacturing method for the power storage module.

REFERENCE SIGNS LIST 1, 10 Power storage module
2 Cell storage body
3 Power storage cell
3a Positive electrode terminal
3b Negative electrode terminal
4 Pressing member
4a, 46 Edge portion
5 Temperature sensor (temperature measurement device)
6 Water jacket (temperature control device)
21 Top plate
21a Inner wall surface of top plate
22 Bottom plate
22a Inner wall surface of bottom plate
23 Side plate
23a, 26a Wall surface
24 Opening
25 Flange part
26 Partition plate
27 Cell storage space
40 Deformable member
41 Storage bag
43 Storage bag opening
61 Heat transfer sheet

The invention claimed is:

1. A power storage module comprising:
a cell storage body;
a cell storage space disposed in the cell storage body and having parallel wall surfaces;
a power storage cell stored in the cell storage space; and
a sheet-shaped pressing member disposed to face the wall surfaces of the cell storage space via the power storage cell and configured to apply a pressing force to the wall surfaces with respect to the power storage cell, wherein the pressing member includes
a deformable member made of an elastic body or a structure having expansibility, and
a storage bag in which the deformable member is stored,
wherein the storage bag has a storage bag opening, is sealable by closing the storage bag opening thereof and is deformed according to a change in shape of the deformable member, and
wherein the deformable member is compressed by reducing a pressure of the inside of the storage bag, and is restored and expands from a compressed state thereof by flowing a fluid into the storage bag via the storage bag opening.

2. The power storage module according to claim 1, wherein the pressing member presses the power storage cell against the wall surfaces by expanding in a thickness direction.

3. The power storage module according to claim 1, wherein the pressing member is sandwiched between two power storage cells.

4. The power storage module according to claim 1, wherein a fluid is sealed in the storage bag.

5. The power storage module according to claim 4, wherein the fluid is sealed in the storage bag by closing the storage bag opening, and the fluid sealed in the storage bag stored in the cell storage space is a gas or a liquid.

6. The power storage module according to claim 1, wherein the deformable member is of a foamed body.

7. The power storage module according to claim 1, wherein the deformable member is of a resin fiber aggregate.

8. The power storage module according to claim 7, wherein the resin fiber aggregate is a nonwoven fabric made of polyolefin-based resin fibers or phenol resin fibers.

9. The power storage module according to claim 1, wherein
the cell storage space has openings which open in a direction in which the parallel wall surfaces extend,
a positive electrode terminal of the power storage cell is disposed in one of the openings and a negative electrode terminal of the power storage cell is disposed in the other of the openings, and
the storage bag opening is provided at an edge portion of the pressing member exposed from one or the other of the openings and the storage bag opening is disposed at a position not overlapping the positive electrode terminal or the negative electrode terminal when viewed from a thickness direction of the power storage cell.

10. The power storage module according to claim 1, wherein
the cell storage space has openings which open in a direction in which the parallel wall surfaces extend and a positive electrode terminal and a negative electrode terminal of the power storage cell are disposed in one of the openings, and
the storage bag opening is provided at an edge portion of the pressing member exposed from the other of the openings.

11. The power storage module according to claim 1, wherein a plurality of cell storage spaces are linearly disposed inside the cell storage body in a direction in which the parallel wall surfaces are aligned.

12. The power storage module according to claim 1, wherein the cell storage body is an integrally molded product obtained by impact molding or extrusion molding of a metal material.

13. The power storage module according to claim 1, wherein the power storage cell has a laminate pack shape in which a battery element is sealed in an exterior body made of a laminate film.

14. The power storage module according to claim 1, wherein the pressing member is placed in the cell storage space with the power storage cell, after the deformable member in the storage bag has been compressed by reducing a pressure of the inside of the storage bag and then the storage bag including the compressed deformable member is sealed.

15. The power storage module according to claim 1, wherein the storage bag opening is provided at the storage bag to cause a fluid to flow into the storage bag via the storage bag opening and restore the deformable member from the compressed state.

16. A manufacturing method for a power storage module comprising:
a pressing member forming step in which a deformable member made of an elastic body or a structure having expansibility is stored in a storage bag, the deformable member is compressed by reducing a pressure of the inside of the storage bag, and then a storage bag opening of the storage bag is sealed, by closing the storage bag opening thereof, to form a sheet-shaped pressing member, wherein, in response to compressing of the deformable member, the storage bag is deformed according to a change in shape of the deformable member;

a lamination step in which a power storage cell and the pressing member are laminated and stored in a cell storage space having parallel wall surfaces disposed in a cell storage body, wherein the pressing member is disposed to face the parallel wall surfaces of the cell storage space via the power storage cell and is configured to apply a pressing force to the parallel wall surfaces with respect to the power storage cell; and a restoration step in which the pressing force against the parallel wall surfaces with respect to the power storage cell is imparted to the pressing member by opening the storage bag opening of the storage bag, thereby reducing a pressure at an inside of the storage bag, and causing a fluid to flow into the storage bag, through the storage bag opening, to expand and to restore the deformable member from the compressed state by expanding the deformable member.

17. The manufacturing method for a power storage module according to claim 16, wherein a resin fiber aggregate is used for the deformable member in the pressing member forming step, and the storage bag opening is closed after a liquid as the fluid has flowed therein in the restoration step.

* * * * *